Patented July 9, 1935

2,007,349

UNITED STATES PATENT OFFICE 2,007,349

PROCESS OF MANUFACTURING LEAD GLASS

Ludwig Schertel, Essen-Ruhr, Germany, assignor to firm: Th. Goldschmidt A.-G., Essen-Ruhr, Germany No Drawing. Application September 9, 1932, Serial No. 632,393. In Germany September 14, 1931

4 Claims. (Cl. 49—77)

This invention relates to the manufacture of lead glass; and it comprises a method wherein silica and litharge are fused and combined on a hearth to make a glass free of uncombined components, a substantial amount of alkali carbonate being usually added in making the fusion, the glass is cooled, comminuted and remelted to produce a homogeneous glass; correcting additions being often added in remelting to obtain glasses of particular properties all as more fully hereinafter set forth and as claimed.

Lead glass is much used for optical and decorative purposes because of its high index of refraction and other special properties. Necessarily, commercial glass must meet exacting requirements as to quality; the composition must be precisely adjusted and complete physical homogeneity must exist. Because of these requirements and of certain difficulties in manufacture hereinafter set forth, it is customary to make lead glass in small batches, using crucibles in lieu of the ordinary types of glass furnace employed for other glasses. Crucibles and small scale operation are expensive in material, labor and fuel.

Lead glass is a silicate of lead oxid and alkali; the alkali being usually $K_2O$ though for special purposes $Na_2O$ may replace the $K_2O$ in whole or in part. What is termed "normal lead glass" contains PbO, $K_2O$ and $SiO_2$ in a molecular ratio corresponding to 1:1:3. Considered as a silicate it is quite acid. Commercial lead glasses intended for one purpose or another may contain a variety of other components; but the basic mixture is this "normal" glass. The silica content is mostly high.

The raw materials usually employed in making a melt are white, iron-free sand, commercial carbonate of potassium and either massicot or red lead. Massicot is a loose, porous, pulveriform PbO made by oxidizing metallic lead at a temperature below the melting point of PbO; and red lead, $Pb_3O_4$, is a physically similar, higher oxid of lead made by oxidizing massicot at a temperature insufficient to cause fusion. Litharge, the cheapest commercial form of PbO, is not used. Litharge is a by-product of metallurgical operations where, as in ordinary scorifications, temperatures are used high enough to cause PbO to melt and flow. Massicot and red lead are both materials of low apparent specific gravity because of the fluffy and porous nature of the ultimate particles while litharge is a dense heavy material. In making a glass melt in a crucible fine litharge settles to the bottom at once and it is difficult afterwards to secure a homogeneous fusion.

Sand is rather inert and difficult to flux, and especially where acid silicates are made. For this reason in making a batch of lead glass in a crucible, high temperatures are used; temperatures which are much higher than those either necessary or convenient in working with the batch after it is made. In fluxing a batch of mixed powders, the fluffiness of the massicot or red lead is desirable as hindering sinking and segregation; but it renders the penetration of heat slow. Commercial potash (potassium carbonate) is always made by wet processes and it also is a relatively open textured material. Again, this is desirable, as slowing segregation in melting; but is inconvenient in retarding the penetration of heat.

Crucible operation is always expensive but in making lead glass it is particularly so since the units are small, the temperatures required are high and the operation is slow. Apart from the time required for fluxing sand to an acid silicate, a long time is required to secure a physically homogeneous melt. The higher the temperature, the lower the viscosity of the glass and the sooner homogeneity can be secured. Substantial homogeneity is imperative in lead glass intended for optical purposes.

In working the melt into articles, lower temperatures and viscosity are wanted.

In the present invention the manufacture of lead glass is cheapened by using litharge as a source of lead and by performing the preliminary high temperature chemical operations in an ordinary reverberatory or hearth furnace; providing what may be called a glass stock. With this stock available, the operations in the crucible are limited to melting the stock and bringing it to convenient working temperature. At this time, any necessary corrections in the composition can be made and it is not difficult to secure homogeneity without the use of high temperatures or unduly long periods of heating. With a proper stock, it is not necessary to add PbO, silica or alkali in the crucible; additions are ordinarily confined to minor amounts of other materials required by particular specifications to be met.

With the glass stock of the present invention, high grade lead glass can be conveniently and economically made in the ordinary furnaces at ordinary temperatures and with the ordinary apparatus used with other types of glass. For example, a working bath of lead glass can be established and maintained in an ordinary glass furnace, replenishment being with the glass stock of the present invention.

While the difference in specific gravity between litharge and lead glass, or between litharge and sand, makes the use of litharge impractical in crucible operation, on the other hand in an open hearth furnace, litharge and sand can be caused to react as a comparatively shallow layer which may be stirred if desired. High temperatures can be conveniently used and reaction and fluxing are quick and ready; even in making high silica glass. No residue of unreacted silica or of lead oxid remains in ordinary operation; and the product is physically and chemically homogeneous. A glass stock may be made with silica and litharge alone; but ordinarily it is more desirable to incorporate the needed alkali at this time; either as potassium carbonate or as sodium carbonate, or both.

The complete combination between lead oxid and silica which can be effected in the present invention, together with the high ratios of silica possible, make the glass stock available also as an enamel for ceramic ware. Lead glazes are desirable in many cases but for sanitary reasons the lead oxid must occur in a form not easily soluble in acids. Dilute acetic acid or vinegar, say 4 per cent acid, is the usual test; application of acid being for 30 minutes. It is difficult to secure regularly and invariably in ordinary practice glazes and enamels withstanding this test from the usual mixtures containing quartz, feldspar, borax, soda, potash, etc., having an addition of red lead or massicot. These mixtures are usually fused or fritted, ground to a powder and directly applied in making stoneware, majolica, etc., being fired in place. Complete reaction of the lead oxid is not absolutely certain under all conditions. By substituting the glass stock of the present invention for the massicot or red lead in making these glaze compositions, glazes and enamels having the lead completely insoluble can be easily and regularly obtained. In making the glass stock temperatures are used higher than those employed in glazing and enameling and complete reaction of the lead oxid with formation of insoluble silicates is positively secured.

For the present purposes the binder in a lead glaze may be considered lead glass.

In making glass stock for use as a component of glass or glazes, its composition can be adjusted to the results desired. For readily fusible glazes, it is sometimes desirable to lower the ratio of silica to lead oxid to 1:1, but ordinarily somewhere between 1:1 and 3:1 is used. The lead glass ratio of 3:1 is satisfactory in many cases.

Incidentally, the use of glass stock as a component of glazes makes glazing a safer operation since the workman does not use lead in any soluble form and the glazes do not give off lead fumes.

In the manufacture of glass stock, fine ground litharge and fine ground quartz, or quartz sand, are simply mixed in the required ratio and brought to clear fusion, removed, cooled and fine ground. But as stated it is commonly more convenient to add alkali at this time and make a fused double silicate. The use of alkalis added as such in the ordinary crucible method has not only disadvantages because of their low specific gravity and fluffy nature but because they are more or less hygroscopic; and particularly potassium carbonate. By incorporating them in the glass stock, these difficulties disappear. However, by combining all the silica with lead oxid in the reverberatory to make a glass stock, there is no difficulty in incorporating alkali in the glass melt in a crucible. Even with high silica, a lead-silica glass stock is, comparatively speaking, a readily fusible material. Double silicates containing alkali are still more fusible. For the present purposes, it is immaterial whether the compositions containing lead silicates and alkali silicates be regarded as double silicates or as solid solutions.

According to the melting point of the glass stock desired, different types of lead silicates may be used, monosilicates, bisilicates or trisilicates. For example, there may be assembled 0.5 molecule $Na_2O$ (or $K_2O$), 0.5 molecule PbO and 1 molecule $SiO_2$. In another composition there is used 0.5 molecule $K_2O$ (or $Na_2O$), 0.5 molecule PbO and 3 molecules $SiO_2$. In practically all cases however it seems advisable to use lead silicates which are definitely acid, except where acid materials are subsequently used in a glaze or a glass composition. The glass stock of the present invention however should not contain any unreacted $SiO_2$.

The word "powdered" herein is used synonymously with granulated or finely divided.

What I claim is:—

1. In the manufacture of homogeneous, optically clear lead glass, a process which comprises fusing on a reverberatory hearth by flame heat a mixture of lead oxid and silica in the ratio required to form a lead silicate free from uncombined lead oxid or silica, withdrawing and cooling the melt, comminuting the cooled melt, and fusing the comminuted material in a crucible at a moderate temperature until optical homogeneity is obtained, ingredients other than lead oxid and silica required in making the complete glass being added to the lead silicate at some stage in the operation.

2. The process of claim 1 wherein ingredients other than lead oxid and silica are added during the fusion on the hearth.

3. The process of claim 1 wherein ingredients other than lead oxid and silica are added in the crucible.

4. The process of claim 1 wherein ingredients other than lead oxid and silica are added both on the hearth and in the crucible.

LUDWIG SCHERTEL.